United States Patent [19]

Scott et al.

[11] Patent Number: 4,968,138

[45] Date of Patent: Nov. 6, 1990

[54] SYSTEM FOR MONITORING INTENSITY DURING HOLOGRAPHIC EXPOSURE

[75] Inventors: James E. Scott, Culver City; John E. Wreede, Moneovia, both of Calif.

[73] Assignee: Hughes Aircraft Company, Los Angeles, Calif.

[21] Appl. No.: 281,434

[22] Filed: Dec. 8, 1988

[51] Int. Cl.$^5$ .............................................. G01J 1/04
[52] U.S. Cl. .................................... 356/121; 350/3.65
[58] Field of Search ............... 356/121, 218, 222, 225, 356/226; 350/3.65, 3.7, 3.81, 3.83

[56] References Cited

U.S. PATENT DOCUMENTS

| | | | |
|---|---|---|---|
| 4,458,977 | 7/1984 | Arns et al. | 350/3.65 |
| 4,458,978 | 7/1984 | Arns et al. | 350/3.83 |
| 4,478,490 | 10/1984 | Wreede et al. | 350/3.81 |

*Primary Examiner*—F. L. Evans
*Attorney, Agent, or Firm*—Leonard A. Alkov; Wanda K. Denson-Low

[57] ABSTRACT

A system for monitoring intensity before, during, and after holographic exposure includes a monitoring assembly within an exposure beam and intermediate a light source and a hologram recording assembly. With the monitoring assembly in the exposure beam, a monitoring beam is produced that is directed towards detection elements located outside of the exposure beam. At the same time, the monitoring assembly allows the exposure beam to pass therethrough and onto the hologram recording assembly. The monitoring assembly may include a reflection hologram with an effective shape which is different from the supporting substrate, or glass substrates with an internal reflecting surface. In either event, the exposure beam remains undistorted. The spatial arrangement among the light source, hologram recording assembly, and detection elements are such that a reflected beam from the hologram recording assembly is directed away from the detection elements to avoid incorrect intensity monitoring.

16 Claims, 1 Drawing Sheet

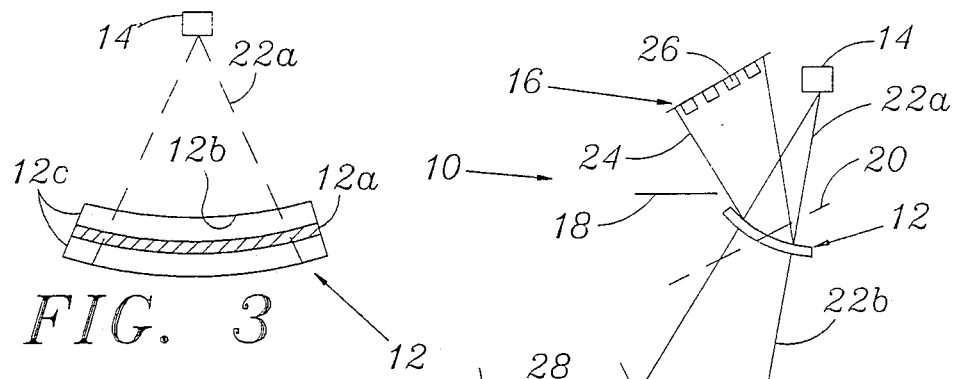
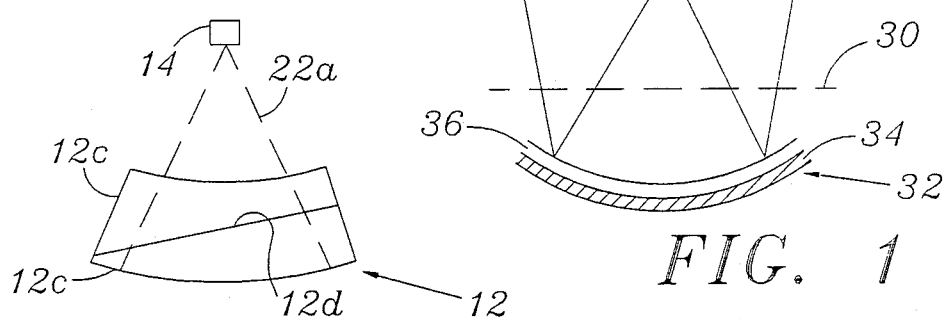
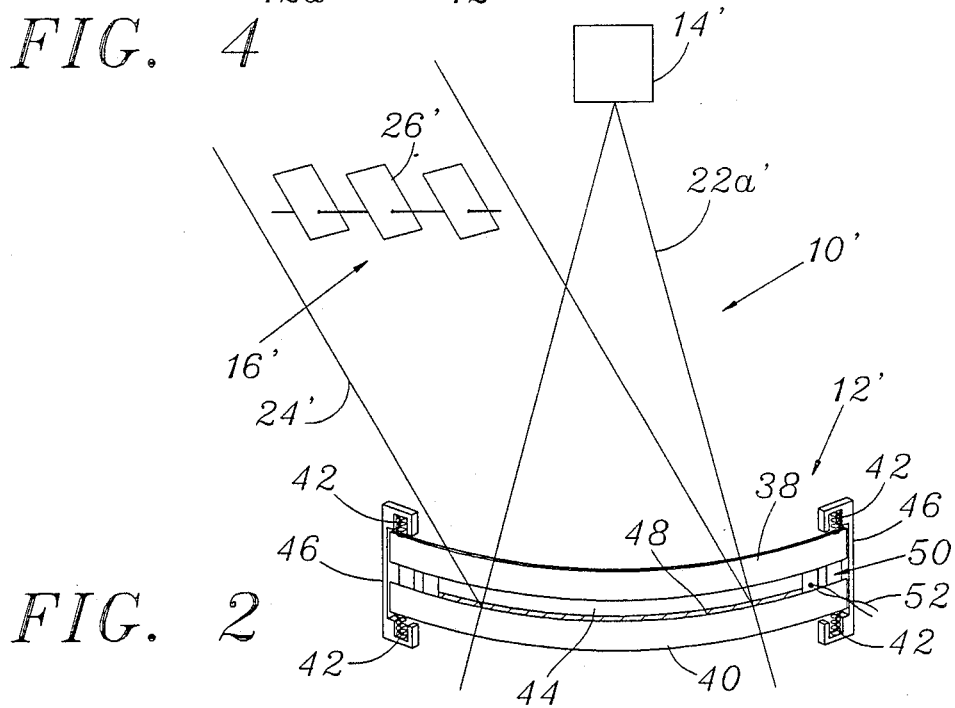

SYSTEM FOR MONITORING INTENSITY DURING HOLOGRAPHIC EXPOSURE

BACKGROUND OF THE INVENTION

1. Field of the Invention

The present invention generally relates to the manufacture of holograms and, more specifically, to an improved method for monitoring the intensity during exposure of an exposure beam incident upon a hologram recording assembly.

2. Description of the Prior Art

In the production of hologram, such as those used for head-up displays (HUDs), helmet-mounted displays, and other pictorial-type holograms, such as those that might be used for automotive displays, it becomes particularly important to ensure that a wavefront with a specified intensity distribution be provided. Of course, as the need for higher quality holographic image increases, the need to monitor intensity increases. An ideal intensity monitoring system should be capable of operation prior to, during, and even after the exposure of the photosensitive film in the hologram recording assembly. Such a system enables monitoring during the most critical period—exposure—as well as during the times that the exposure can be adjusted. Further, an ideal system will not alter the exposure beam as a result of monitoring.

A prior monitoring system has been able to monitor the intensity of an exposure beam prior to the beam passing through a spatial filter in front of the photosensitive film. This method, however, accounts for total intensity but does not account for unevenness in the exposure beam, since the measured beam is unexpanded. Because there is considerable change in uniformity when the beam passes through the filter, the measurement has limited utility.

Another past method limits the monitoring to before and after exposure. Since the monitoring detectors are located on a light shutter, only when the shutter is closed will the detectors be in an operational position.

Yet another past method uses a beam splitter to reflect a portion of the exposure beam into detectors. This, however, suffers from the fact that the beam splitter cannot be formed with an optical shape to prevent distortion of the beam and, at the same time, reflect the beam to detector. To prevent distortion, the beam splitter would need outer surfaces with a point source at the center of curvature of the surfaces. That, however, would be impractical because, if an outer surface is reflective, the beam will reflect back on itself.

Another past system monitors the exposure beam in a single beam system after the exposure beam hits the photosensitive film. The drawback in this system is the need for two systems, since measurement is only being taken during the exposure itself and corrections must be made for absorption by the film.

In another system, a scanning system monitors the brightness of the hologram being created. The scanning system uses a light source of a wavelength not absorbed by the film and thus not reactive with the film. A chosen angle of incidence produces a diffracted beam that can be monitored. However, this is inadequate when both brightness of the beam creating the hologram and brightness of the hologram formed need to be monitored.

A need still exists in the art to provide an improved system for monitoring intensity during holographic exposure.

SUMMARY OF THE INVENTION

Accordingly, it is an object of the invention to provide an improved system and method for the manufacture of holograms.

Another object of the present invention is to provide a system for monitoring exposure beam intensity during holographic exposure.

Still another object of the present invention is to monitor exposure beam intensity in a fashion that prevents distortion of the exposure beam.

The objects of the present invention are achieved by utilizing a monitoring assembly within an exposure beam and positioned intermediate a light source and a hologram recording assembly. With the monitoring assembly in the exposure beam, a monitoring beam is produced that is directed towards detection elements located outside of the exposure beam. At the same time, the monitoring assembly allows the exposure beam to pass therethrough and onto the hologram recording assembly. The monitoring assembly may include a reflection hologram with an effective shape which is different from the supporting substrate, or glass substrates with an internal reflecting surface. In either event, the exposure beam remains undistorted. The spatial arrangement among the light source, hologram recording assembly, and detection elements are such that a reflected beam from the hologram recording assembly is directed away from the detection elements to avoid incorrect intensity monitoring. The monitoring assembly can be constructed in a manner that causes movement relative to the hologram recording assembly in order to produce phase shifts in the exposure beam to reduce noise that would otherwise be present in the recording assembly. The production of phase shifts to reduce noise is generally described in U.S. Pat. Nos. 4,458,978 and 4,478,490, both of which are incorporated herein by reference.

The objects of the present invention can best be seen from an examination of the accompanying claims, specification, and drawings hereto.

BRIEF DESCRIPTION OF THE DRAWINGS

FIG. 1 is a schematic diagram of a monitoring system according to one preferred embodiment of the present invention;

FIG. 2 is a partial schematic diagram of a second preferred embodiment of the present invention;

FIG. 3 is a side view of a monitoring assembly in the monitoring system according to one preferred embodiment of the present invention; and FIG. 4 is a side view of a monitoring assembly in the monitoring system according to a second preferred embodiment of the present invention.

DETAILED DESCRIPTION OF THE PREFERRED EMBODIMENTS

The following description is provided to enable any person skilled in the art to which the present invention pertains, or with which it is most nearly connected, to make and use the same, and sets forth the best mode contemplated by the inventors of carrying out their invention. Various modifications, however, will remain readily apparent to those skilled in the art, since the generic principles of the present invention have been defined herein specifically to provide an improved method of monitoring intensity during holographic exposure.

FIG. 1 schematically depicts a monitoring system 10 according to one preferred embodiment of the present invention. A light source 14, such as a laser, produces an exposure beam 22a that is directed onto a monitoring assembly 12 which constitutes a part of the monitoring system 10. In this particular embodiment, as shown in FIG. 3, the monitoring assembly 12 includes a conventionally-designed phase reflection hologram 12a made of dichromated gelatin or polyvinyl carbazole, and having a diffraction efficiency of approximately 10%, which can be made in accordance with that generally shown in U.S. Pat. No. 4,458,978. With such an efficiency, interference from reflections off of an antireflective coated outer surface 12b of the assembly is negligible. In addition, the monitoring assembly 12 has a pair of glass substrates 12c which envelope the hologram 12a and are sealed together with an optical adhesive. The substrates are shaped such that reflections are prevented from impinging an array of detectors which are described below. The shape of the glass substrate are preferably spherical with its center being at the effective source of the light source 14. Thereby, the monitoring assembly 12 adds some distance to the overall exposure beam before reaching the hologram recording assembly described below, but does not distort such beam, since the beam is incident at a normal angle.

The monitoring assembly 12 provides an effective mirror position 20 which is indicated in FIG. 1 by the dashed lines intersecting the assembly 12. The effective mirror position 20 represents a plane along which a planar mirror would need to be placed but for the existence of the monitoring assembly 12. In the embodiment described above, the reflection hologram acts as a mirror at the position 20.

As noted above, the monitoring assembly 12 receives the exposure beam 22a. It then reflects a portion of such beam in the form of a monitoring beam 24 which is received by a detection subsystem 16. The monitoring beam 24 has, as a result of the monitoring assembly 12, the same intensity characteristics as those in the exposure beam 22a. It will also have the same intensity characteristics as an exposure beam 22b described below.

As shown in FIG. 1, the detection subsystem 16 includes an array of detection elements 26 which can be of any appropriate conventional design in the art, such as silicon PIN diodes, to detect intensity of the monitoring beam 24. The detection subsystem 16 is positioned outside of the exposure beam 22a, as well as the exposure beam 22b, to eliminate disturbances in the exposure beams themselves. The totality of exposure beams 22a, 22b will hereinafter be referred to as exposure beam 22.

The exposure beam 22b represents a continuation of the exposure beam 22a after it has passed through the monitoring assembly 12. The exposure beam 22b passes a position at which a shutter assembly 30 is positioned as indicated by dashed lines in FIG. 1. The shutter assembly 30 can be of any appropriate conventional design in the art, such as a mechanical or electrically controlled thin metal plate, and is used to control an exposure time period when a hologram is being developed. The shutter assembly 3 can be placed anywhere between the monitoring assembly 12 and the recording assembly 32 describes as follows.

Still referring to FIG. 1, the hologram recording assembly 32 can be provided with a conventional design and, in this particular embodiment, has a photosensitive film 36, such as one made of gelatin, and is supported on a mirror 34. Accordingly, the hologram recording assembly 32 receives the exposure beam 22b and then reflects therefrom a reflected beam 28.

As can be appreciated, the relative positions of the light source 14, the recording assembly 32, and the detection subsystem 16 are such that the reflected beam 28 is directed away from the detection subsystem 16 to avoid inaccuracies of measurement of the exposure beam 22. As a further safety measure, a conventionally-designed baffle 18, such as a thin, metal plate, is positioned intermediate the detection subsystem 16 and the recording assembly 32 to shield the subsystem 16 from the reflected beam 28.

It can be seen that the above first preferred embodiment of the present invention provides a method and system for monitoring the intensity of the exposure beam 22 prior to exposure of the recording assembly 32. At that time, the shutter assembly 30 is effectively shielding the recording assembly 32 from the exposure beam 22. However, the monitoring assembly 12 still provides a monitoring beam 24 which is indicative of the intensity of the exposure beam 22, and the detection subsystem 16 can receive the monitoring beam 24. Hence, the intensity characteristics of the exposure beam 22 can be monitored prior to exposure of the recording assembly 32, and any appropriate adjustments to the exposure beam can be made. During exposure, the monitoring assembly 12 continues to provide the monitoring beam 24, which is indicative of the intensity characteristics of the exposure beam 22, while not adversely affecting the exposure beam 72 itself. After exposure, the same operational characteristics will exist as those prior to exposure.

FIG. 2 shows a second preferred embodiment of the present invention wherein a monitoring system 10' is provided like that of the monitoring system 10 in the first preferred embodiment. In the monitoring system 10', as in the first preferred embodiment, a light source 14' produces an exposure beam 22'a which is received by a monitoring assembly 12'. The monitoring assembly 12' produces a monitoring beam 24' that is received by a detection subsystem 16' having an array of detection elements 26'. While not shown in FIG. 2, the exposure beam 22'a passes through the monitoring system 12', as in the first preferred embodiment, to provide an exposure in a recording assembly.

Unlike the first preferred embodiment, the monitoring assembly 12' of the second preferred embodiment is constructed to provide phase shifts in the exposure beam to reduce coherent noise in the exposure system. This is similar to the global phase shifter system disclosed in U.S. Pat. No. 4,458,978, which is incorporated herein by reference. As shown in FIG. 2, the monitoring assembly 12 includes a pair of layered glass substrate 38, 40, with a monitoring hologram 48 being placed on the lower glass substrate 40. An index matching oil layer 44 is sealed between the glass substrate 38 and the monitoring hologram 48 by an oil seal 50. The substrate, hologram, and oil are held by a pair of clamps 46 via springs 42. In this fashion, and as further explained in U.S. Pat. No. 4,458,978, the glass substrates can be moved relative to each other and to the hologram 48 itself via PZT crystals 52 which are controlled by a power source (not shown). As mentioned above, such movement tends to shift light reflected at the outer surfaces of the substrates 38, 40 in phase with the exposure beam 22'a, the monitoring beam 16', and also to each other. This consequently reduces coherent noise due to the substrate surfaces.

While the above embodiments describe the monitoring assembly 12 as having a hologram therein, the present invention contemplates that a hologram need not be used, although it does provide a very easy way of obtaining an apparent surface of different shape than the actual shape. Alternatively, a reflective surface 12a in the monitoring assembly 12 can be provided by standard deposited coating wherein two glass substrates are provided with an inner surface 12d being reflective, as shown in FIG. 4. The incident surface or side that is directly adjacent the light source 14 and the surface that is furthest from the light source 14 are shaped to be normal to the exposure beam. As such, the glass substrates 12c replace the hologram and substrates as referred to in reference to FIG. 1. It can also be appreciated that a phase shifting system referred to above can be employed with this particular embodiment of the monitoring assembly 12.

The present invention provides a system for monitoring the intensity of the exposure beam during the entire exposure process, that is, before, during, and after exposure. The present invention does not significantly affect the exposure beam except to slightly lengthen the path length of the exposure beam between the light source and the recording assembly, and also to slightly but not adversely reduce the intensity of the exposure beam.

The above only describes certain preferred embodiments of the present invention, and it is contemplated that various modifications to the above can be effected but nevertheless come within the scope of the claims.

What is claimed is:

1. A system for monitoring beam uniformity for hologram development, comprising:
    monitoring means for receiving an exposure beam and transmitting a portion of said exposure beam to a recording assembly, and directing another portion of said exposure beam to detection means thereby producing a monitoring beam having the characteristics of the exposure beam, said monitoring means being operational prior to, during, and after an exposure period; and
    detection means for receiving a monitoring beam produced by said monitoring means, said monitoring beam being characteristic of said exposure beam.

2. The system according to claim 1 further including stop means for stopping light beams which are produced by said recording assembly from impinging said detection means.

3. The system according to claim 1 wherein said detection means is positioned outside of said exposure beam.

4. The system according to claim 1 wherein said monitoring means transmits said exposure beam to said recording assembly with substantially the same characteristics as that when said exposure beam is received.

5. The system according to claim 1 wherein said monitoring means comprises a hologram.

6. The system according to claim 1 wherein said monitoring means comprises a pair of glass substrate with an inner reflective surface.

7. A system for hologram development, comprising:
    light source means for producing an exposure beam;
    detection means for detecting intensity characteristics of said exposure beam;
    recording means for receiving said exposure beam and developing a hologram; and
    monitoring means for receiving said exposure beam and for transmitting intensity characteristics of said exposure beam to said detection means without substantial distortion of said exposure beam.

8. The system according to claim 7 wherein said monitoring means is positioned within said exposure beam.

9. The system according to claim 7 wherein said detection means is positioned outside of said exposure beam.

10. The system according to claim 7 wherein said detection means and light source means are positioned opposite an incident side of said monitoring means.

11. The system according to claim 7 wherein said recording means reflected said exposure beam substantially away from said detection means.

12. In an improved system for monitoring exposure beam intensity during holographic exposure wherein a detection subsystem is positioned outside of said exposure beam, the improvement comprising:
    a monitoring assembly having a hologram for receiving said exposure beam and then transmitting said exposure beam to a hologram recording assembly while providing a monitoring beam to said detection subsystem.

13. The improvement according to claim 12 wherein said hologram is a reflection hologram.

14. The improvement according to claim 12 wherein said monitoring assembly has a configuration that corresponds to a configuration of said exposure beam.

15. The improvement according to claim 12 wherein said hologram has a diffraction efficiency of approximately 10%.

16. The improvement according to claim 12 further including means for imparting motion to said monitoring assembly to reduce coherent noise.

* * * * *